United States Patent [19]
van Ginneken

[11] 3,958,952
[45] May 25, 1976

[54] REACTOR HAVING A CATALYTIC BED WITH UPSTREAM MEANS FOR FILTERING SOLID CONTAMINANTS

[75] Inventor: Adriaan J. J. van Ginneken, Hague, Netherlands

[73] Assignee: Shell Oil Company, Houston, Tex.

[22] Filed: May 6, 1974

[21] Appl. No.: 467,036

[30] Foreign Application Priority Data
May 16, 1973 United Kingdom............... 23243/73

[52] U.S. Cl.............................. 23/288 R; 23/283; 23/284; 23/285; 55/350; 55/419; 210/282; 210/487
[51] Int. Cl.².................... B01J 8/02; B01D 27/08; B01D 27/10
[58] Field of Search........... 208/209, 213; 23/288 R, 23/288 FB, 283, 284, 285, 291; 210/130, 282, 284, 289, 316, 317, 428, 458, 487; 55/76, 350, 419, 512

[56] References Cited
UNITED STATES PATENTS

| | | | |
|---|---|---|---|
| 758,345 | 4/1904 | Abraham............................ | 210/282 |
| 2,221,465 | 11/1940 | Aldham............................... | 210/130 |
| 3,090,667 | 5/1963 | Connellan....................... | 23/288 R X |
| 3,112,256 | 11/1963 | Young et al. ...................... | 23/288 R |
| 3,186,149 | 6/1965 | Ayers................................ | 55/484 X |
| 3,186,806 | 6/1965 | Stiles............................... | 23/288 FB |
| 3,355,021 | 11/1967 | Jones................................ | 210/130 |
| 3,520,417 | 7/1970 | Durr et al. ...................... | 210/282 X |
| 3,590,561 | 7/1971 | Marble............................... | 55/512 |
| 3,758,279 | 9/1973 | Whitesides....................... | 23/288 R |
| 3,824,081 | 7/1974 | Smith et al....................... | 23/288 R |

Primary Examiner—Morris O. Wolk
Assistant Examiner—Bradley R. Garris

[57] ABSTRACT

A process and apparatus for catalytic treatment of a material containing solid contaminants (in particular residue from hydrodesulfurization), the catalytic reactor being provided upstream of the catalyst bed with filter units small enough to be replaced via the reactor inlet, said filter units containing parallel void chambers alternately closed at top and bottom, respectively, (possibly by means of rupture discs), so that material to be filtered flows into a void chamber, through its wall which has filtering (and possibly also catalytic, e.g., demetallizing) properties, and then out of the next void chamber and onto the catalyst bed.

4 Claims, 7 Drawing Figures

REACTOR HAVING A CATALYTIC BED WITH UPSTREAM MEANS FOR FILTERING SOLID CONTAMINANTS

BACKGROUND OF THE INVENTION

The present invention relates to a process and apparatus for the catalytic treatment of materials containing solid contaminants.

The run length of plants operating catalytic processes having feedstocks contaminated with solid particles is very often limited by the maximum allowable pressure drop across the catalytic reactor(s) and not by the decline in activity of the catalyst. During operation of the pressure drop across the reactor(s) gradually increases owing to solid particles blocking the interstices between the catalyst particles, through which the material would otherwise flow, until it finally reaches a level above which economic operation is no longer possible. Although the catalyst then gradually has not lost its activity, yet the plant must be shut down in order to either regenerate the solids-contaminated catalyst in situ — if at all possible — or to remove part or all of it and replace it with fresh catalyst, both of which is expensive. If the feedstock is heavily contaminated with solid particles the increase in pressure drop across the reactor(s) occurs rapidly. Accordingly, the lengthy shut-down periods for catalyst replacement/regeneration are more frequent than would be required by the decline in catalyst activity per se. This is, for obvious reasons, both inconvenient and uneconomic. One method by which catalyst replacement or regeneration may be deferred is to pass the contaminated feedstock through one or more filter units before passing it to the catalyst reactor(s). This, however, involves additional, normally high-pressure equipment which adds significantly to the capital cost of the plant. It is therefore an object of the present invention to prolong the period between catalyst replacements/regenerations of a plant operating a catalyst process having a feedstock contaminated with solid particles in a simple and economic manner.

Particular feedstocks envisaged by the present process are hydrocarbon materials, and a particular catalytic process in which a rapid increase in pressure drop across the catalytic reactor(s) may occur is the hydrodesulphurization of residual oils since such oils usually contain relatively large amounts of solid particles, and may form additional quantities of such particles upon heating to treatment temperature. In addition to solid particles, however, they also contain to a greater or lesser extent, metal contaminants which have a deleterious effect on the activity of the catalyst, which even may quickly become virtually unregenerable. Accordingly, in cases where the residual oil contains large amounts of metal contaminants as well as of solid particles it is desirable to remove both these unwanted constituents to a substantial degree before passing the residual oil over the catalyst bed(s). To this end it has previously been proposed to pass the residual oil through a catalyst guard reactor, either provided with a fixed catalyst bed, or into which fresh catalyst is continuously or intermittently being introduced and from which spent catalyst is continuously or intermittently being withdrawn, prior to passing it to the main hydrodesulphurization reactor(s). In this way a continuous stream of substantially demetallized, substantially particle-free residual oil is passed to the main hydrodesulphurization reactor(s). A fixed bed guard reactor is normally provided with a twin, which can be connected to the main reactor whenever the pressure drop across the first guard reactor builds up to an unacceptable level; with additional and removal of catalyst, this pressure drop builds up to an equilibrium level and does not reach a level at which operation becomes uneconomic. However, both these embodiments require expensive equipment such as high-pressure vessels and switching valves and/or valves for (particulate) solids and require careful operational control; hence, especially in cases where the residual oil contains only a small amount of metal contaminants and a substantial amount of solid particles a more simple and economical method of removing the solid particles is desirable. It is therefore another object of this invention to provide a process for the hydrodesulphurization of residual oils containing substantial amounts of solid particles in which the catalyst need not be replaced or regenerated for a long period of time.

SUMMARY OF THE INVENTION

According to the present invention a process for the catalyst treatment of a material containing solid contaminants wherein this material is passed at elevated temperatures and pressure over one or more fixed catalyst beds within a reactor is characterized in that a reactor is used which contains upstream of the catalyst bed(s) a filtering device for the removal of solid contaminants, the filtering device used comprising a plurality of filter units, the total surface area of the filter units for initial contact being substantially higher that the cross-sectional surface area of the reactor and the dimensions of a filter unit being such as to allow its introduction and removal via the (a) reactor inlet. When the reactor is shut down occasionally, at least one of these filter units may be replaced by another unit via this inlet during reactor shut-down.

DETAILED DESCRIPTION

Figure 2:
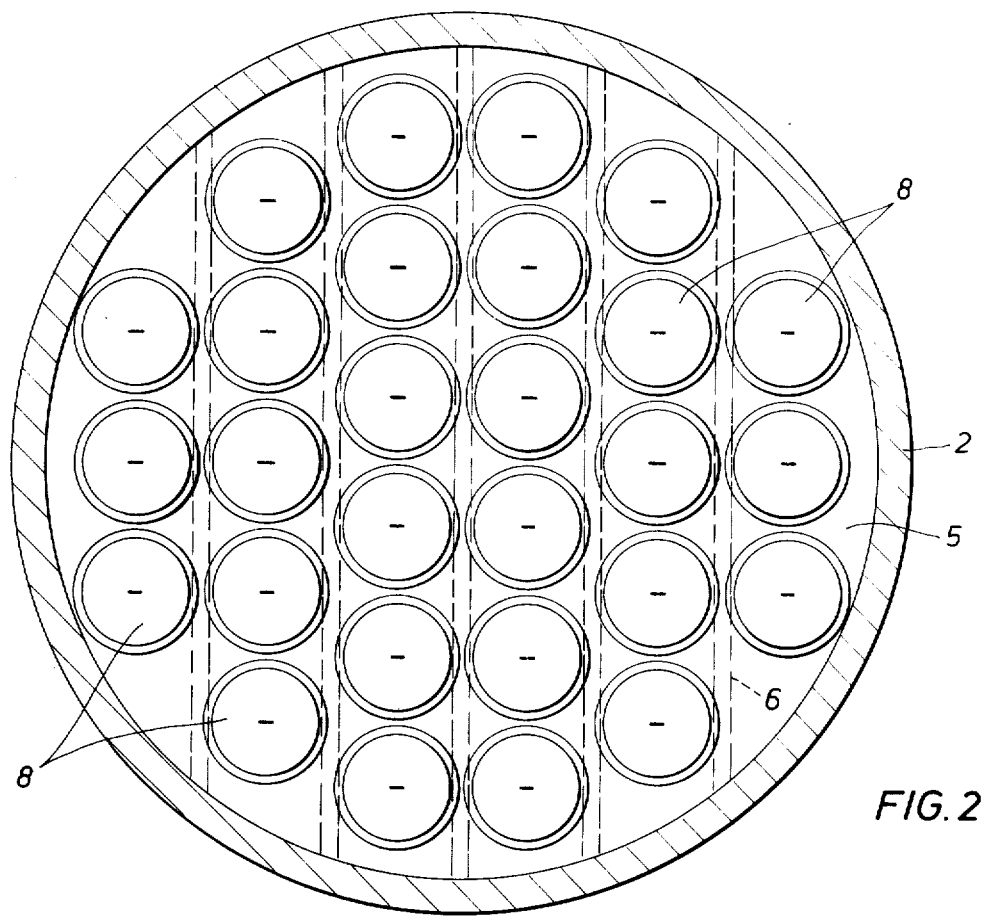
FIG. 2 is a plan view of the reactor depicted in FIG. 1 taken on the section 2—2.

The housing of the filter system inside the reactor (viz. in its top or bottom part, respectively, whenever the catalytic treatment is carried out in downflow or upflow) has an economic advantage in that external filter systems normally involving high pressure filter equipment which is both costly and space-consuming, are not required.

The solid particles which can be removed from materials according to the present invention include those which are substantially solid, that is to say they need not be very hard and may be more or less deformable, but must still have a certain degree of rigidity. Hence pitchy polymeric or resinous particles are also suitably removed according to the present invention. At least part of the particles to be removed need not be present in the oil before treatment, but may be formed during treatment, e.g., under the influence of elevated temperature.

Filter units may be used, the filtering elements in which are constituted, e.g., by plates permeable to gas and/or liquid, e.g., made by sintering together some suitable granular substance; preferably, however, use is made of filter units which as filtering elements encompass a number of at least partly permeable chambers incorporating contact bodies.

The present process may be employed for any catalytic treatment of liquid or vaporous, preferably, hydrocarbon, material contaminated with solid particles in which it is desirable to remove the solid particles from the material before it contacts the catalyst bed(s) and thus reduce the build-up in pressure drop across the bed(s). An example of a case where the present process may be suitably employed is where a (hydrocarbon) feedstock containing catalyst fines, e.g., a slurry oil from a catalyst cracker, is required to be catalytically treated. It is particularly suitable for the catalyst hydrotreatment of hydrocarbon materials containing solid contaminants, such as, for example, iron oxide particles. Such hydrotreatments include, without limitation, hydrogenation, hydrocracking, hydrodemetallization, hydrodesulphurization and/or hydrodenitrification. The hydrodesulphurization of distillate fractions containing solid contaminants is very suitably carried out according to the present invention.

In a particular embodiment the present invention may be advantageously employed for the hydrodesulphurization of a residual oil since, as has already been discussed, residual oils usually contain substantial amounts of solid contaminants which, inter alia, renders it a rather difficult material to process in a fixed bed hydrodesulphurization process owing to rather rapid pressure build-up across the bed. By applying the present process, however, such oils may be very conveniently hydrodesulphurized.

The total surface area of the filter system used according to the present process should be high so as to maintain a low rate of increase in pressure differential across the filter system during operation due to the build-up of particles removed from the (hydrocarbon) material being treated. The low rate of increase in pressure differential across the filter system is achieved because the solid particles become trapped in the filter over a large surface area and therefore at any point on the surface area of the filter flow resistance increases only slowly. According to the present invention it is therefore a requirement that the total surface area of the filter units for initial contact is substantially higher than the cross-sectional area of the reactor.

The rate of increase in pressure differential across the catalyst bed(s) is also low because the filter system removes the large majority of solid particles present in the material to be treated which do not therefore plug the catalyst bed(s). The overall effect is therefore that the rate of increase in pressure differential across the reactor is low. The process therefore operates for an extended period of time during which uneconomically high pressure differentials across the reactor do not occur. Another important advantage of the present process is that since the amount of solid particles which reach the (first) catalyst bed is small, distribution of the feedstock over the catalyst bed is not hindered by the formation of plugged regions in the entrance portion of the bed which detrimentally effect such distribution. Accordingly very good distribution of the material over the catalyst bed is maintained.

Notwithstanding the fact that the rate of increase of pressure differential across the reactor is low there comes a time, after a shorter or longer period of operation, when the pressure differential across the reactor, caused in the main by pressure build-up across the filter system, reaches an unacceptably high level. It is then desirable to be able to shut the reactor down, remove the used filter system, put in a new filter system and restart the reactor again as quickly and conveniently as possible. An important feature of the present process is that the dimensions of a filter unit are sufficiently small so as to allow it to be introduced into and removed from the reactor via the reactor inlet (of which there is normally only one) during reactor shut-down. One advantage of using small filter units is that filter unit replacement may be effected by use of an externally operated mounting device and thus obviate the need for a man to enter the reactor. A further advantage is that since any contact bodies present are contained within small units and are not contained loose in one large bed, replacement of the filter system can be conveniently carried out in a short period of time and thus the amount of time during which the reactor is out of operation is minimized.

In accordance with a very suitable embodiment of the present invention a filter unit is used which comprises a number of elongated chambers substantially co-axial with the reactor which alternately are void and contain contact bodies and which are connected in such a way that material containing solid contaminants enters the filter unit via every second void chamber, passes through the adjacent chamber(s) containing contact bodies, in which solid contaminants are removed, and material containing substantially reduced amounts of solid contaminants leaves the filter unit via the void chamber(s) adjoining said chamber(s) containing contact bodies. This connection between void and filled chambers may be such that, all chambers being provided with permeable side walls, the filled ones are closed at both top and bottom, whereas the void chambers are alternately open at the top and closed at the bottom and vice versa. In this way, material to be treated flows into alternate void chambers in the filter unit but cannot pass out of the same chambers since their other ends are sealed. In order to flow out of the filter unit the material must pass through the chambers containing contact bodies and into the adjacent void chambers which are open at the other end. The solid particles are trapped by contact bodies and the material leaving the filter unit contains a substantially reduced amount of such particles. The advantages of such a filter unit are that a high surface area is available for initial contact and that pressure differential build-up across the unit occurs only slowly.

It is preferred that the material having passed through the outermost chamber(s) containing contact bodies of a filter unit immediately enters into the reactor space surrounding said filter unit, which can be effected by the outermost chamber(s) being of the kind which contains contact bodies and provided with a permeable outer wall towards the reactor space. If such outermost chamber(s) were void or were filled but provided with an impermeable outer wall, they would not materially add to the effectiveness of the filter unit as a whole and still take up valuable reactor space.

As was already set out above, the filter units are located in the reactor upstream of the catalyst bed or beds, which in downflow operation means: in the top part of the reactor. In this case, especially when a liquid material is treated, during initial operation of the type of filter unit described above, the material is preferentially forced through the lower portion of the chambers containing contact bodies, since the head of the material there is higher than in the higher portion. However, as time continues the lower portions of the filled chambers become increasingly clogged with solid particles removed from the material which then preferentially passes through a higher portion of the said chambers. At a certain point in time even the upper portions of these chambers become plugged with solid particles and then the filter unit requires to be changed. The advantage of this type of filter units for the mode of operation in question is that the material to be treated can, in effect, by-pass the lower portions of the filled chambers as they become plugged and therefore offer more resistance to flow and instead pass through a higher portion of the said chambers where the contact bodies are not so contaminated with solid particles yet and therefore offer less resistance to flow. In this way pressure build-up across the filter unit is maintained at a low level while at the same time efficient filtering of the material to be treated is achieved. For safety reasons the closing means in the void chambers may at least in part be constructed so as to open at a certain pressure drop across the filter unit. Hence if for some reason a (sudden and) excessive pressure drop over the filter system should build up, a closure (such as a valve, breaking plate or the like) opens, at least one void chamber becomes open at both ends, offering a reduced resistance to flow, and the pressure in the reactor does not reach a dangerously high level. Such a closing means may also, if desired, be utilized to indicate when (part of) the filter system needs to be replaced, since when it opens a detectable change in pressure drop across the reactor occurs which then signifies that the filter system requires replacing of one or more units.

The physical shape of a filter unit is not of critical importance. Accordingly, a square or rectangular filter unit may be used, in which, if it comprises alternate void and filled elongated chambers, there are sandwiched one parallel to the other. Preferably, however, the chambers in such a filter unit are annular, having a cylindrical form, in which case the innermost chamber should preferably be a void one.

In accordance with another very suitable embodiment of the present invention a filter unit is used which comprises two concentrical cylinders which are coaxial with the reactor. The cylinders have perforated side walls, the inner cylinder is closed at the top and open at the bottom, while the chamber between the cylinders is closed at the bottom, and may be open at the top. The chamber between the cylinders contains contact bodies. The filter units are arranged in such a way that material containing solid contaminants enters the filter unit via the outer cylinder, passes through the chamber containing the contact bodies, and leaves this chamber via the bottom of the inner cylinder.

The terms top and bottom apply to the direction of flow of the material which contains the solid contaminants, the top of the cylinders being the part thereof which is nearest to the reactor inlet through which the said material enters the reactor.

In many cases the material containing solid contaminants will be a mixture of gas and liquid, and if no special precautions are made, gas and liquid will pass through the filter unit. It is preferred to have liquid and gas at least partially separated, which in general will occur in the upper part of the reactor in case the material which contains the solid contaminants flows downstream through the reactor, and to forward at least part of the gas to the catalyst bed without passing the filter units, e.g. with the aid of a bypass. This is very conveniently achieved by attaching to the tray on which the filter units are placed at least one tube which is open at both sides, the upper opening of which is on about the same level as the upper part of the filter unit or higher. These tubes also provide a safety measure as they form an overflow for liquid material in case an excessive pressure drop over the filter system should build up e.g. when the filter units are substantially completely plugged with solid particles.

As has already been discussed above the total surface area of the filter units for initial contact is substantially higher than the cross-sectional area of the reactor. It is an advantage to have as high a total filter surface area as possible since longer operating periods are thereby achieved. Accordingly the total surface area of the filter units for initial contact is preferably at least 5 times the cross-sectional surface area of the reactor. In this way, it may even be possible to extend the periods between reactor shut-downs, required for filter replacement to a length in which the catalyst activity of the catalyst has also declined to an inadmissible extent, so that the latter decline, rather than fouling, becomes the determining factor for all reactor shut-downs.

The size of any contact bodies present should be chosen such that a high proportion of the solid particles in the material to be treated which would otherwise become trapped in and plug the catalyst bed(s) is removed in the filter units. It is therefore preferably that the contact bodies are at an average smaller than or equal to the average catalyst size in the catalyst bed(s). The average size of the void spaces between the contact bodies in the filter units is then not greater than the size of the void spaces in the catalyst bed(s) with the result that those solid particles in the material which are smaller than the void spaces between the contact bodies and therefore may pass through the filter are also smaller than the void spaces in the catalyst bed, so that they will generally also pass through the catalyst bed and do not cause significant plugging. Preferably the diameters of the contact bodies lie in the range of 0.05 (0.1) to 10 millimeters.

The chemical nature of the contact bodies, when used, is not of critical importance although the contact material must be able to withstand the conditions of temperature and pressure used during operation. The contact bodies may be made, for example and without limitation, from brick, sand, alumina or porous carbon. The contact bodies may be catalytically inert with respect to the reactants taking part in the catalytic process but sometimes it may be desirable to use a catalyst for the contact bodies in the filter units. In such cases either the same or a different catalyst material as that used in the catalyst bed(s) may be used or in the contact bodies in the filter units. Contact bodies in the filter units may very suitably comprise a catalyst suitable for catalyzing demetallization and/or desulphurization; when, for instance, the catalyst in the fixed bed is a hydrodesulphurization catalyst (which may also have some demetallization properties), the contact bodies may advantageously also comprise a desulphurization catalyst, preferably the same, or comprise a demetallization catalyst (which may also to a certain extent desulphurize).

In spite of the fact that a filter system as is envisaged by the present invention is used in a catalytic reactor a small amount of solid particles present in the feed to the reactor does pass through the filter system and get caught in the catalyst bed(s). This has the effect of gradually creating a pressure build-up across the reactor. In view of this it is desirable to have a large surface area of catalyst as well for initial contact. In this way the particles which become trapped in the catalyst bed(s) do so over a large surface area and as explained above with reference to the filter system the rate of increase in pressure differential across the catalyst bed(s) is therefore low. A method by which the surface area of a catalyst bed may be suitably increased is to place wire mesh baskets in the surface of the catalyst bed. The material thus not only passes through the end of each basket in order to contact the catalyst particles but also through the sides of each basket. In this way an increase in the catalyst surface area for initial contact by a factor of about four is easily achievable.

A layer of ceramic particles having a size equal to or larger than the catalyst size is suitably placed in the wire mesh baskets. The ceramic particles must be equal to or larger than the contact bodies in order to allow all the solid particles contained in the material to pass through the void spaces between them. Ceramic balls are suitably placed across the wire mesh baskets according to a preferred embodiment of the present process.

Any available catalyst may be used in the process according to this invention. The catalyst dimensions may therefore vary widely and the catalyst particle diameters may lie in the range of 0.1 to 10 millimeters. Catalyst particles having diameters in the range of 0.1 to 5 millimeters are, however, more usual, these being more commonly available.

As mentioned hereinbefore the present process is very suitable for the catalytic hydrotreatment of hydrocarbon materials. The catalyst which may be advantageously employed for such hydrotreatment preferably contains one or more metals of Group VI B (chromium, molybdenum, tungsten) and/or the Iron Group (iron, nickel, cobalt) of the Periodic Table of Elements and/or one or more oxides and/or sulphides of such metal(s) deposited on a refractory oxidic carrier. Examples of such a carrier are alumina, silica, magnesia, titania, zirconia, and mixtures thereof.

The reaction conditions used for the hydrotreatment according to a preferred embodiment of this invention may vary within wide limits and will primarily depend on the nature of the hydrocarbon feedstock used. The temperature may vary between 300° and 475°C and the total pressure from 20 to 350 kg/cm². The weight hourly space velocity may vary between 0.1 and 10 parts by weight of fresh feed per part by volume of catalyst per hour.

The invention also relates to an apparatus suitable for carrying out the process described hereinbefore. This apparatus comprises a reactor with at least one inlet and at least one outlet which reactor contains at least one bed of catalyst and upstream thereof a plurality of filter units which preferably contain contact bodies, the total surface area of the filter units for initial contact being substantially higher than the cross-sectional area of the reactor and a filter unit having dimensions such as to allow its introduction and removal via the (a) reactor catalyst inlet. Normally, there will be only one inlet in such a reactor, serving to introduce gaseous and/or liquid reactants and also to charge catalyst to the bed(s). However, separate inlets may of course be present, and also several outlets for effluent.

As already indicated above, in a very suitable embodiment of the present invention a filter unit advantageously comprises a number of elongated chambers substantially co-axial with the reactor which alternately are void and contain contact bodies, all chambers being provided with permeable side walls, the void chambers being alternately open at the top and closed at the bottom and closed at the top and open at the bottom, and the other chambers being closed at both top and bottom, the outermost chamber(s) preferably containing contact bodies. The material to be filled flows down alternate void chambers, passes through the filled chambers and out of the filter via the void chambers adjacent to the latter chambers as was explained earlier in this patent specification. As was already mentioned, the filter units may have any suitable form such as square, rectangular or even triangular form although they preferably have cylindrical form and consist of cylindrical elongated chambers co-axial with the reactor, the innermost of these being a void one. Although filter units having different sizes and/or shapes may be present, they are preferably all of the same size as well as shape.

The width of the chambers may vary widely and depends to a large extent on the size of the filter units. Advantageously, the width of all void chambers is substantially equal and so is the width of all filled chambers, the width of a void chamber possibly being different from that of a filled one. The ratio of the width of the void chambers to the width of the chambers containing contact bodies lies preferably between 1:5 and 2:1.

The filter units are preferably supported within openings in a tray positioned in the reactor upstream of the catalyst bed, such openings normally having substantially the same size and shape as the cross-section of the filter unit. Preferably each unit incorporates means for attaching it to a (dis)-mounting device. The means by which the filter unit is attached to the (dis)mounting device during mounting and dismounting may be for example one or more hooks incorporated in (the top of) the filter unit. The filter unit may then easily be taken, e.g. lifted out of the reactor by hooking it to an external dismounting (lifting) device. Any other suitable means for attaching the filter units to the (dis)-mounting device may, however, be used.

In another very suitable embodiment of the present invention a filter unit comprises two concentrical cylinders which are coaxial with the reactor, and which possess perforated side walls. The inner cylinder is closed out the top and open at the bottom, while the chamber between the cylinders, which contains contact bodies, is closed at the bottom and may be open at the top. These filter units are preferably supported within openings in a tray positioned in the reactor upstream of the catalyst bed, such openings normally having substantially the same size and shape as the cross section of the inner cylinder. Each filter unit preferably incorporates means for attaching it to a (dis)mounting device as described for the filter units discussed above.

The size of a filter unit may vary within wide limits, the only restriction being that it must be small enough to be able to pass through the (an) inlet of the reactor. Usually one inlet is situated on the main axis of the reactor, the diameter of such an inlet being not greater than 1 meter, and therefore the largest dimension of the filter unit in the plane perpendicular to the main axis of the reactor should in that case not be larger than 1 meter. The dimension of the filter unit in an axial direction to the main axis of the reactor may of course be greater than 1 meter. This for example would be the case if the filter unit was a cylinder of diameter 0.5 meter, and a height of 1.5 meters. This filter unit could easily be removed from an inlet having a diameter of 1 meter. The size of each filter unit supported in the tray positioned upstream of the catalyst bed need not be uniform. In particular the height of the filter units may vary and for example taller units may be positioned towards the centre of the tray from whence they may easily be removed. Towards the outside of the tray less tall units are preferable in order that their removal from the reactor is not made difficult on account of their limited manoeuverability caused by their height and their close proximity to the reactor wall.

The number of filter units positioned in the reactor upstream of the catalyst bed(s) may vary widely and depends, inter alia, on the diameter of the reactor and the diameter of the filter units. In general, however, the ratio of the diameter of the reactor to the diameter of a filter unit should preferably lie between 3:1 and 20:1. The number of filter units usually lies between 2 and 100.

The invention may be performed in various ways and some specific embodiments will now be further elucidated with reference to the drawings.

Figure 1:
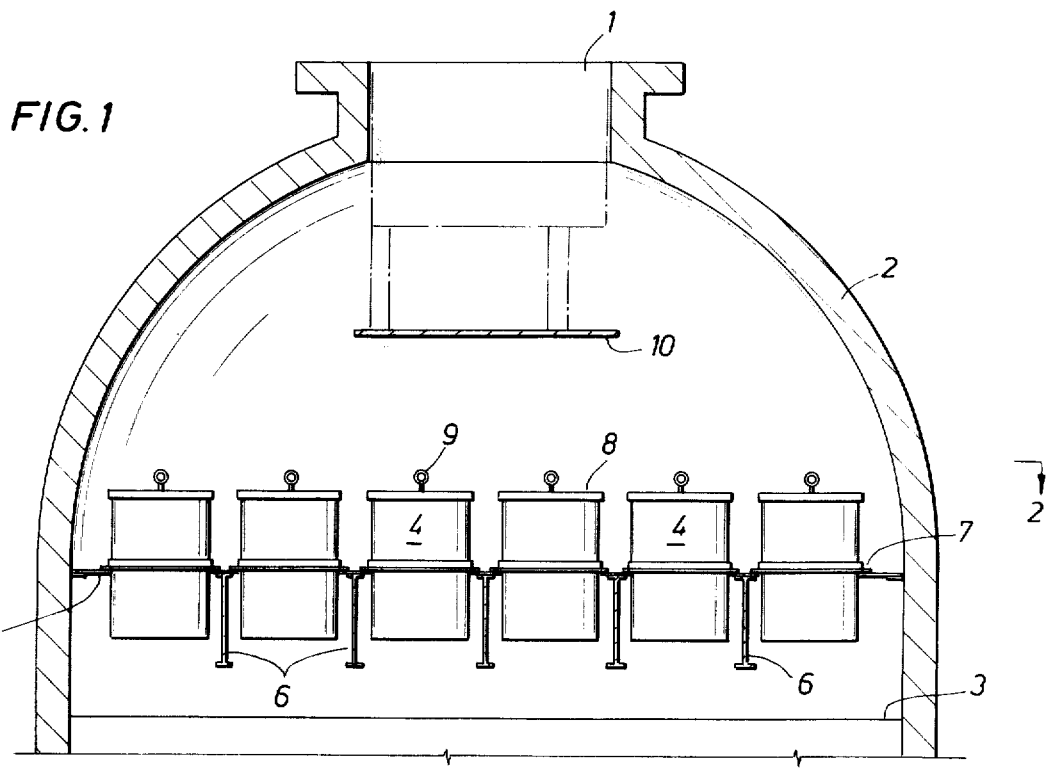
FIG. 1 shows a cross-sectional side elevation of a reactor containing six rows of filter units.

Referring to FIG. 1 the numeral 1 indicates the feed inlet of a reactor 2. The reactor contains a feed distribution tray 3 below which is situated a catalyst bedd (not shown). Upstream of the feed distribution tray are mounted six rows of — in this case cylindrical — filter units (in this side elevation shown as six individual units, 4). The filter units are supported within round openings in a steel tray 5 which itself is supported by girders 6. Each filter unit has a steel flange 7 by means of which it is supported within the openings on the steel tray and a cover 8 incorporating a hook 9 by which the filter unit can be lifted in and out of the reactor via the feed inlet. Upstream of the filter units an impingement plate 10 is positioned so as to allow a good distribution of the feed over the filter units. FIG. 2 is a plan view of the reactor 2 taken on the section 2—2 and requires no explanation.

Figure 3:
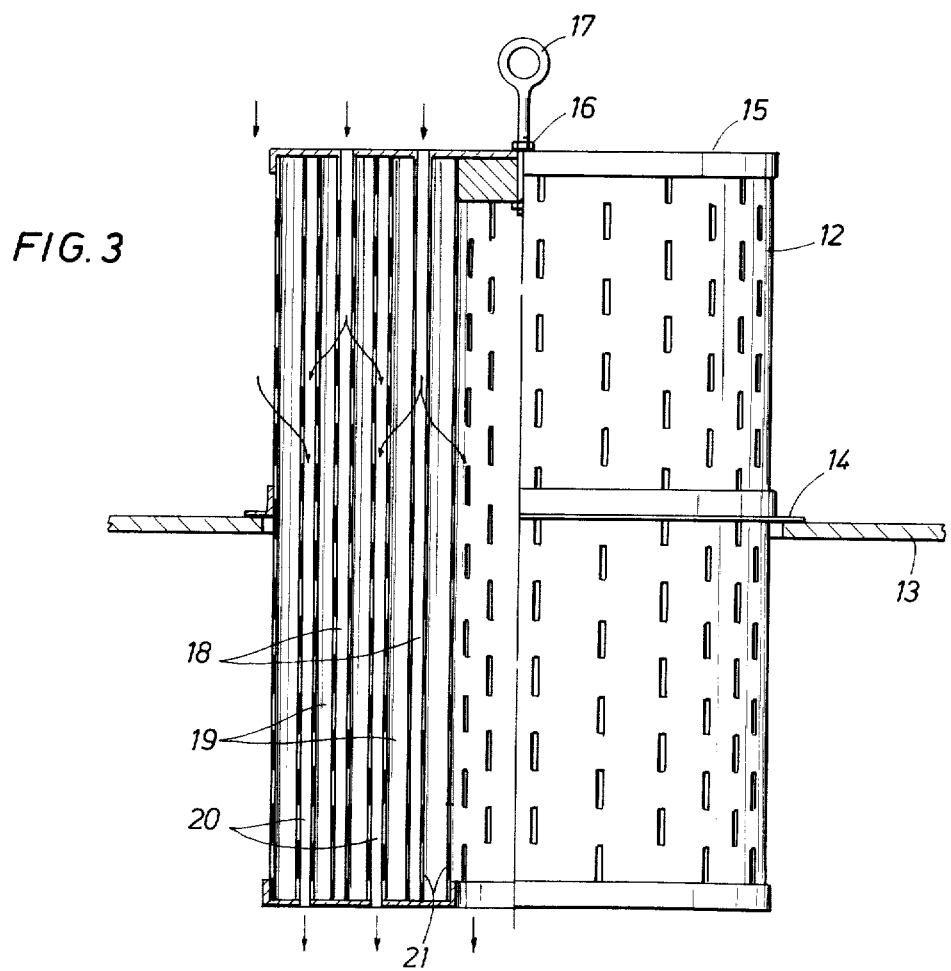
FIG. 3 shows a filter unit in detail.

FIG. 3 illustrates in more detail a preferred embodiment of a filter unit as shown in FIG. 1. The lefthand side of the figure shows the filtering elements of the unit and illustrates how the hydrocarbon feed flows through the filter unit. In the case shown, these elements encompass chambers with permeable walls which alternately are void and incorporate contact bodies, although instead of the latter type of chambers, permeable (e.g. sintered) plates or the like might also be present. The right-hand side shows the external appearance of the unit.

The cylindrical unit 12 is supported within a round opening in a steel tray 13 which itself is supported by a number of girders (not shown). The filter unit rests within the opening by means of a steel flange 14 attached to and encircling the middle of the filter unit which flange has a larger diameter than the diameter of the round opening. A removable cover 15 is bolted on to the top of the filter unit by a bolt 16 which itself is connected to a steel hook 17. This hook is used for lifting the unit in and out of the reactor.

Referring to the left-hand side of FIG. 3 the feed flows into the filter unit via every alternate void chamber 18 which is open at the top but closed at the bottom. It then passes through the adjacent chambers 19 containing contact bodies where solid contaminants in the feed are removed and into the void chambers 20 adjoining the chambers containing contact bodies. The walls of the void chambers and of those containing contact bodies are in this case constructed from metal sheets with perforations 21, in this case slot-shaped but possibly otherwise, e.g., round, in order to allow passage of the oil feed, but might be constructed of any other suitable permeable material. e.g. (metal) gauze or (crossed) metal strips or bars. The void chambers 20 are closed at the top but open at the bottom. The feed leaves the filter unit at the bottom of the void chambers 20. The outermost chamber in this case is a filled one, and the innermost chamber void, which enhances the efficiency of the filter unit.

Figure 4:
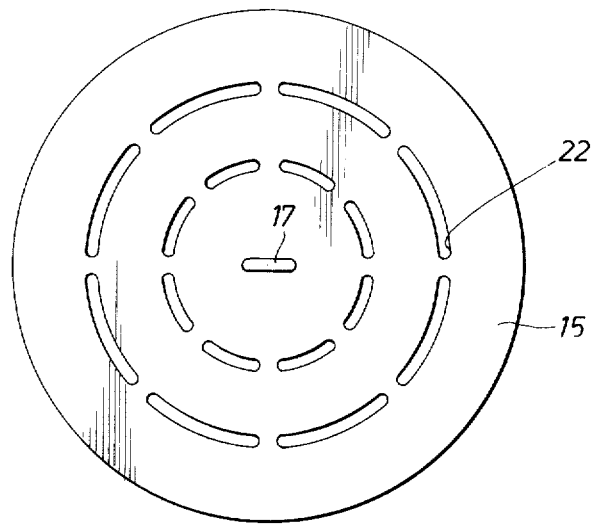
FIG. 4 shows a plan of the top of the filter unit shown in FIG. 3.

FIG. 4 shows a plan of the top of the filter unit depicted in FIG. 3. The numeral 15 indicates a removable cover of the filter unit and 22 indicates slits in the cover for allowing the passage of feed. The numeral 17 indicates a hook for lifting the unit in and out of the reactor.

Figure 5:
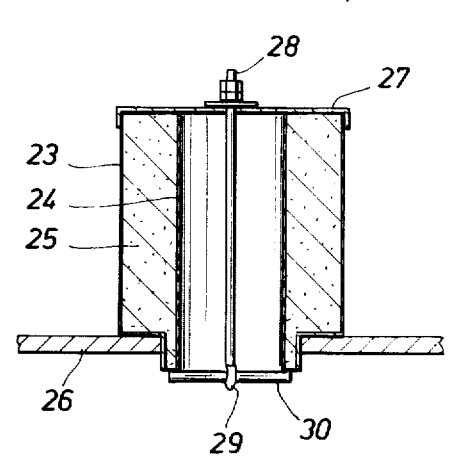
FIG. 5 shows a filter unit which comprises two concentric cylinders.

The filter unit of FIG. 5 shows two cylinders 23 and 24 with perforated side walls. The chamber 25 between the cylinders is filled with solid material. The filter unit is supported within a round opening in the steel tray 26, and the room below steel tray 26, which contains the catalysst beds, is in open connection with the inner cylinder 24. A removable cover 27 is on top of both cylinders. The filter unit can be removed from the reactor with the aid of bar 28 which is connected with the aid of steel hook 29 to a supporting rod 30.

Figure 6:
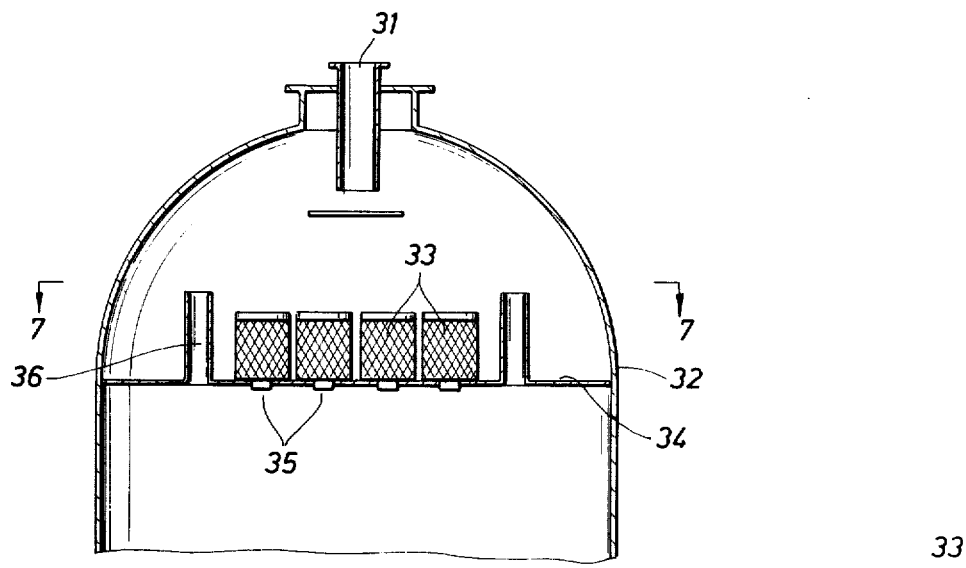
FIG. 6 shows a cross-sectional side elevation of a reactor containing filter units and tubes for gas that bypassed the filter units.

In FIG. 6 numeral 31 indicates the feed inlet of a reactor 32. Filter units 33 are supported by steel tray 34 in such a way that material which has been filtered can enter the room below the tray 34 (which contains the catalyst beds) via openings 35. On tray 34 open tubes 36 are mounted which allow gas to enter the room below tray 34 without passing through the filter units. Each filter unit is provided with means (not depicted) for removing it from the reactor.

Figure 7:
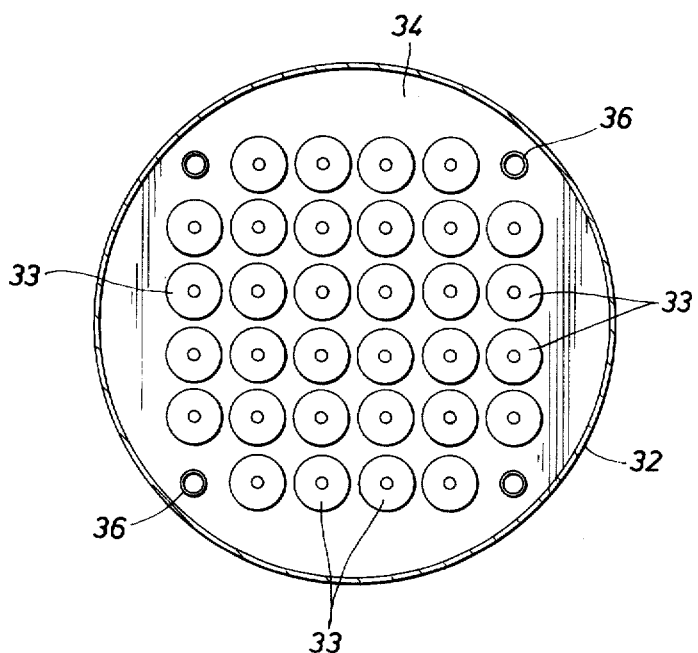
FIG. 7 is a plan view of the reactor shown in FIG. 6 taken on the section 7—7.

FIG. 7 is a plan view of the reactor 32 taken on the section 7—7 and requires no further explanation.

The following Example will further elucidate the invention.

EXAMPLE

A residual oil obtained in the atmospheric distillation of a crude petroleum had the following properties:
Initial boiling point: 350°C
Viscosity at 100°C: 30 cS
Specific gravity 70/4°C: 920 kg/m$^3$
Sulphur content: 3.9% by weight
Metal contaminants (V,Ni, etc.): 60 ppm by weight
Solid particles: 30 ppm by weight
Average size of solid particles: $3 \times 10^{-3}$ mm This residue was used as starting material for the hydrodesulphurization process described hereinbefore with the aid of an apparatus as shown in FIG. 1.

The filter system consisted of 28 cylindrical filter units supported on a tray positioned above the catalyst bed. The tray had a diameter of 2 meters being the same diameter as the inside of the reactor. The diameter of each filter unit was 25 centimeters and the height 100 centimeters. Each filter unit contained 13 kilograms of porous aluminum oxide as contact material. Each filter unit comprised five void chambers, having a width of 12.5 millimeters and four chambers containing contact bodies, also having a width of 12.5 millimeters. The average size of the contact bodies was 0.8 millimeters and the surface area for initial contact per filter unit was 1.72 m², i.e., the total surface area for initial contact was 15.3 times the cross sectional surface area of the reactor.

The catalyst contained cobalt and molybdenum on an alumina carrier having an average particle size of 1.5 mm. The height of the catalyst bed was 14 meters. Reaction conditions were such that the average sulphur content of the oil stream leading the reactor during the whole period of operation was 1.25% by weight. The initial pressure drop across the reactor was 1.5 kg/m².

The process was operated for a period of 3 months until the pressure drop across the reactor had risen to 3 kg/m². At this point it was considered necessary to shut the reactor down and introduce new filter units. After replacing the old filter units with new filter units (which took less than 24 hours) the process was restarted and the initial pressure drop across the reactor was 1.6 kg/m², i.e., not substantially more than when the process was initially started up. This shows that the catalyst bed itself did not become substantially plugged during the 3 months of operation. A similar period of operation was again possible after the filter unit replacement mentioned above was carried out and catalyst regeneration or replacement — which take about a week and thus are much lengthier operations than merely replacing the filter units — was only necessary after about one year, viz. when the disulphurization activity of the catalyst bed had materially declined.

Accordingly this Example shows that when hydrodesulphurizing a hydrocarbon oil having a high solid particle content according to the present invention it is possible to operate the process for a long period of time with very short interruptions only before having finally to shut the reactor down for an extended period.

What is claimed is:

1. In an apparatus for the catalytic reaction of a material selected from the group consisting of gaseous and liquid materials and mixtures thereof said material containing solid contaminants, comprising a reactor having an upstream inlet and an outlet and containing at least one bed of catalyst and disposed in said reactor upstream of said catalyst bed a tray supporting a plurality of filter units for removing said contaminants from said material, the total surface area of the filter units being substantially higher than the cross sectional area of the reactor, the improvement comprising that said filter units are arranged and constructed on said tray for individual replacement via said reactor inlet and that each of said filter units comprises a number of concentrically disposed elongated chambers substantially co-axial with the reactor and having a top and bottom, which chambers alternately are void and contain contact bodies, all chambers being provided with permeable side walls, the void chambers being alternately (1) open at the top and closed at the bottom and (2) closed at the top and open at the bottom, and said void chambers (1) and (2) being separated from each other by the chambers containing contact bodies, said contact body-containing chambers being closed at both top and bottom, whereby a high filter surface area is available and the rate of pressure differential build-up across the filter units is slow.

2. The apparatus of claim 1 including the further improvement wherein the void chambers are of substantially equal width, the chambers containing contact bodies are also of substantially equal width, and the ratio of the width of the void chambers to the width of the chambers containing contact bodies lies between 1:5 and 2:1.

3. In an apparatus for catalytic reaction of a material selected from the group consisting of gaseous or liquid materials and mixtures thereof, said material containing solid contaminants, comprising a reactor having an upstream inlet and an outlet and containing at least one bed of catalyst and disposed in said reactor upstream of said catalyst bed a tray supporting a plurality of filter units for removing said contaminants from said material, the total surface area of the reactor, the improvement wherein said filter units are arranged and constructed on said tray for individual replacement via said reactor inlet, said filter units having dimensions such as to allow introduction and removal thereof via the reactor inlet; and wherein each of said filter units comprises a number of concentrically disposed elongated chambers substantially co-axial with the reactor and having a top and bottom, which chambers alternately are void and contain contact bodies, all chambers being provided with permeable side walls, the void chambers being alternately (1) open at the top and closed at the bottom and (2) closed at the top and open at the bottom and said void chambers (1) and (2) being separated from each other by the chambers containing contact bodies, said contact bodies-containing chambers being closed at both top and bottom, and at least part of said void chambers being provided with means for opening when the pressure drop across the filter units reaches a predetermined upper limit.

4. The apparatus of claim 3 wherein the improvement further comprises that said opening means are breaking plates.

* * * * *